United States Patent
Raborn

[11] 3,938,613
[45] Feb. 17, 1976

[54] MOTOR KILL SWITCH WITH OPERATOR ATTACHED TETHER

[75] Inventor: Eldridge W. Raborn, Sherman, Tex.
[73] Assignee: Robert A. Gordon, Sherman, Tex.
[22] Filed: Oct. 1, 1974
[21] Appl. No.: 511,037

[52] U.S. Cl. ............... 180/99; 180/82 R; 200/334; 70/444
[51] Int. Cl.² ................. B60K 27/08; H01H 27/06
[58] Field of Search ........... 180/99, 82 R; 200/52 A, 200/161, 153 F, 334; 123/179 R; 70/444

[56] References Cited
UNITED STATES PATENTS

| | | | |
|---|---|---|---|
| 2,722,575 | 11/1955 | Dobkins | 180/82 R |
| 2,725,947 | 12/1955 | Dooley | 180/82 R |
| 3,210,494 | 10/1965 | Murdock | 200/161 X |
| 3,507,259 | 4/1970 | Lankford | 200/161 X |
| 3,825,092 | 7/1974 | Graydon | 188/99 X |
| 3,827,039 | 7/1974 | Agnese | 200/153 F X |

*Primary Examiner*—Kenneth H. Betts
*Assistant Examiner*—R. Schrecengost
*Attorney, Agent, or Firm*—Clarence A. O'Brien; Harvey B. Jacobson

[57] ABSTRACT

An elongated body is provided with structure at one end for oscillatably supporting an ignition switch key therefrom with the axis of oscillation of the key extending transversely of the elongated body and extending normal to the panel-like key blank through the end thereof remote from the blade portion of the key. The other end of the body includes an endwise outwardly opening recess in which an anchor element is telescopingly seated and frictionally retained. The anchor element is frictionally retained within the recess against outward displacement therefrom and one end of an elongated flexible tension member is anchored to the anchor element. In addition, a guide member is provided for mounting in predetermined position relative to an associated ignition switch and is operable to slidably and guidingly engage an intermediate portion of the tension member. The other end of the tension member remote from the anchor element includes an anchor member for attachment to the driver of a vehicle incorporating the aforementioned ignition switch. The guide member is positioned in relation to the ignition switch whereby a pull on the end of the tension member to be anchored to the vehicle driver will effect a lateral pull on the corresponding end of the body to rotate the ignition key (and thus the oscillatable tumbler barrel of the ignition switch) to the off position in which off position the elongated body is disposed in a substantially straight line path extending between the ignition key and the guide member. A further pull on the end of the tension member to be attached to the vehicle driver results in the anchor element being pulled from seated engagement within the aforementioned recess to thereby disconnect the tension member from the elongated body and key so as to prevent damage either to the elongated body, the key or the associated tumbler barrel as a result of a sharp pull on the tension member.

6 Claims, 3 Drawing Figures

U.S. Patent Feb 17, 1976 3,938,613
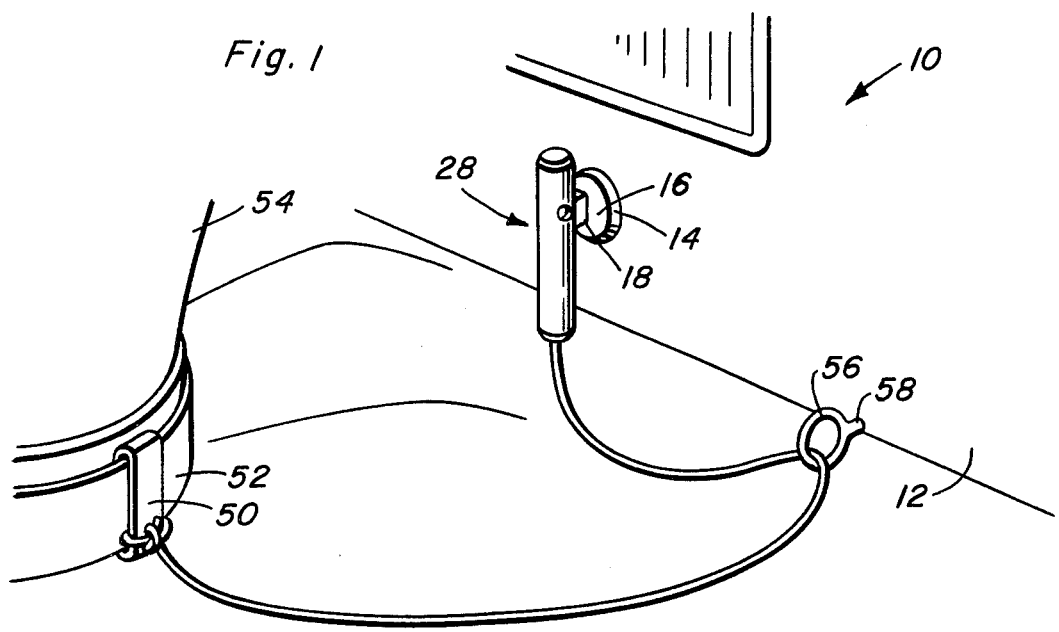
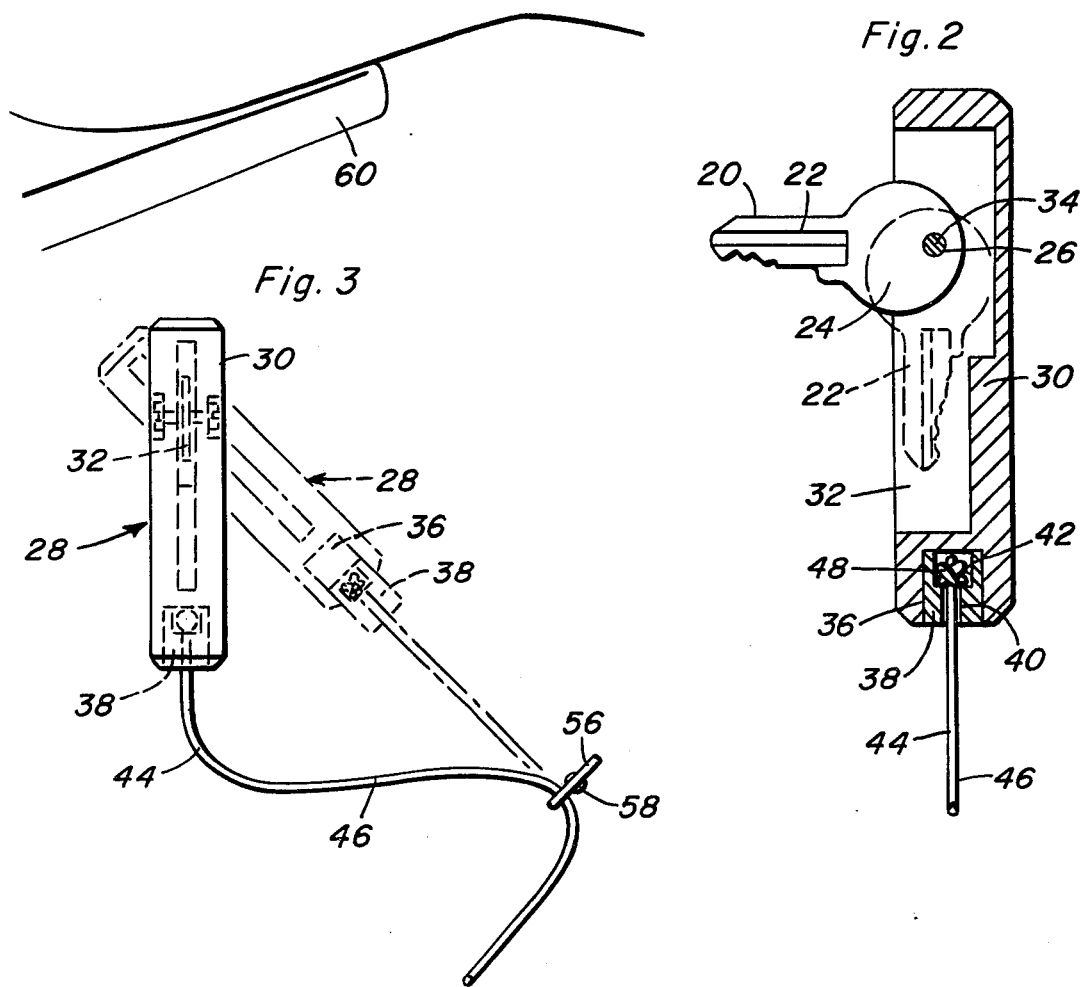

MOTOR KILL SWITCH WITH OPERATOR ATTACHED TETHER

BACKGROUND OF THE INVENTION

Various forms of devices for opening an ignition circuit in the event of vehicle upset involving the driver of a vehicle being dislodged from his driver's station have been heretofore designed. However, most of these previously designed devices have involved special ignition circuitry and/or a special ignition switch assembly or modification of an existing ignition switch assembly. Accordingly, the expense involved in manufacturing, marketing and selling safety cut-off devices for ingition switches has resulted in the purchase of such a safety device being reasonably expensive. Still further, safety devices of this type which involve either a specifically designed ignition switch, extensive modification of an existing ignition switch, or the provision of supplemental ignition circuitry require at lease semi-skilled labor to accomplish installation of the safety device on an associated vehicle resulting in further expense to the ultimate user of the safety device.

Examples of previously patented safety devices of the type above discussed may be found in U.S. Pat. Nos. 2,722,575, 2,725,947, 3,786,892 and 3,801,767.

BRIEF DESCRIPTION OF THE INVENTION

The safety device of the instant invention requires only an inexpensive key holder in the form of an elongated body member from one end of which the finger-engageable end of an ignition key is oscillatably supported, an elongated flexible tension member, a guide eye and a first anchor element on one end of the tension for releasable engagement with the end of the key holder body remote from the associated key and a second anchor element or member on the other end of the tension member for attachment to the driver of the associated vehicle. Thus, the safety device may be readily manufactured, marketed and purchased for a low cost and involves only the attachment of a guide eye to the associated vehicle insofar as required modifications of the vehicle with which the safety device is to be used. As a result of the associated vehicle requiring only the attachment of a guide eye thereto, even unskilled persons may readily make the necessary modification of the associated vehicle in a very short period of time and with a minimum of tools.

The main object of this invention is to provide a safety device for automatically opening the ignition switch of a vehicle as a result of the operator of the vehicle being dislodged from his driver's position.

Another object of this invention, in accordance with the immediately preceding object, is to provide a safety device which will require a minimum of modifications to the existing vehicle.

A still further object of this invention is to provide a safety device which may be readily adapted to substantially all ignition circuit equipped vehicles.

A final object of this invention to be specifically enumerated herein is to provide an ignition safety device in accordance with the preceding objects and which will conform to conventional forms of manufacture, be of simple construction and easy to use, so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary perspective view of the driver's station of an ignition circuit equipped vehicle and with the safety device of the instant invention operatively associated with the ignition key of the vehicle and the operator of the vehicle;

FIG. 2 is an enlarged longitudinal vertical sectional view of the elongated body portion of the safety device from which the associated ignition key is oscillatably supported and with one end of the elongated flexible tension member portion of the invention anchored to the end of the body remote from the ignition key; and FIG. 3 is an elevational view of the elongated key supporting body portion of the invention, the adjacent end of the flexible tension member portion of the invention and the dashboard mounted guide eye portion of the invention in operative association therewith and with the position of the elongated body portion of the invention when the ignition switch is in the off position, illustrated in phantom lines.

DETAILED DESCRIPTION OF THE INVENTION

Referring now more specifically to FIG. 1 of the drawings, the numeral 10 generally designates a vehicle including a dashboard or similar structure 12 from which an ignition switch 14 including an oscillatable tumbler barrel 16 is supported. The tumbler barrel 16 has a key blade receiving slot 18 formed therein for receiving the blade portion 20 of a conventional ignition key 22, the ignition key 22 including an enlarged planar end portion 24 remote from the blade portion 20.

The enlarged planar end portion 24 has a bore 26 formed therethrough and the ignition switch 14 is in the on position when the planar end portion 24 of the key is vertically disposed and in the off position when the planar end portion 24 of the key 22 is rotated approximately 45° in a counter-clockwise direction in the manner illustrated in phantom lines in FIG. 3.

The safety device of the instant invention is referred to in general by the reference numeral 28 and includes an elongated cylindrical body 30 having a longitudinally extending and generally radially outwardly opening slot 32 formed therein.

The planar end portion 24 of the key 22 is oscillatably supported within the slot 32 by means of a pivot pin 34 extending across the slot 32 and having its opposite ends secured in the portions of the body 30 on opposite sides of the slot 32. The ignition key 22 is oscillatable between the extended solid line position thereof illustrated in FIG. 2 and the retracted phantom line position thereof illustrated in FIG. 2 with the key 22 substantially fully recessed within the slot 32.

The end of the body 30 remote from the pivot pin 34 is provided with an endwise outwardly opening cylindrical recess 36 and a cylindrical anchor element 38 is tightly, but removably, seatingly telescoped in the recess 36. The anchor element 38 has a bore 40 formed axially therethrough and the end of the bore 40 which opens into the inner end of the recess 36 includes an enlarged counterbore 42. One end portion 44 of an elongated flexible tension member 46 is passed through the bore 40 and provided with an enlargement in the form of a knot 48 on its free end, the knot 48 being seated in the counterbore 42. The other end of the tension member 46 has a second anchor element 50 thereon and the anchor element 50 is in the form of an anchor sleeve through which the belt 52 of the operator 54 of the vehicle 10 may be received. In this manner, the anchor element 50 is securely anchored to the belt 52 of the operator 54.

The only other necessary element to the safety device 28 comprises a guide structure 56 which is in the form of a guide eye including a shank portion 58 which is anchored to the dashboard 12 of the vehicle 10. The shank portion 58 may include sheet metal screw threads for securement through a metal dashboard, or the shank portion 58 may include machine screws for securement through a bore in the dashboard 12 by means of a nut threaded on the free end of the shank portion 58 on the backside of the dashboard 12.

The intermediate portion of the tension member 46 passes through the guide eye 56 and is freely longitudinally slidable relative to the guide structure. Also, the anchor element 38 is of a diameter to be received through the anchor eye 56.

In operation, the safety device 28 may be installed on the vehicle 10 by the securement of the anchor eye 56 in the position illustrated in FIG. 1 and the attachment of the body 30 to the planar end portion 24 of the ignition key 22. Then, whenever the operator 54 wishes to drive the vehicle 10, before the engine of the vehicle 10 is started, the driver 54 loosens his belt and slips the sleeve defining anchor element 50 from the end of the tension member 46 remote from the body 30 on his belt before the latter is retightened. At this point, the safety device 28 is in full readiness for operation.

With the body 30 disposed in the vertical position thereof illustrated in FIG. 1, the ignition switch is in an "on" position, the phantom line representation of the body 30 in FIG. 3 illustrating the position of the body 30 when the ignition switch is in the "off" position.

With the vehicle operating and the body 30 in the vertical position thereof illustrated in FIG. 1, any movement of the operator 54 from his seat 60, other than directly toward the dashboard 12, will result in the tension member 46 being tightened and a pull being exerted on the end of the tension member 46 secured to the anchor element 50. This pull on the tension member 46 will cause the body 30 to be swung from the solid line position thereof illustrated in FIG. 3 to the phantom line position illustrated in FIG. 3 with the tumbler barrel 16 of the ignition switch 14 in the off position. However, if a further pull is exerted on the tension member 46, the anchor element 38 will be pulled outwardly from the recess 36 against the frictional forces which tend to maintain the anchor element 38 seated in the recess 36 and the anchor element 38 is sufficiently small in diameter to be readily received through the eye 56. Therefore, even in the event of movement of the operator 54 completely away from the operator's position of the vehicle 10, damage will not be imparted upon the safety device and yet the ignition circuit of the vehicle 10 will be opened.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination a vehicle having a dashboard panel of the type including an outer surface opposing a location on the vehicle to be occupied by the operator of the vehicle, an ignition switch mounted on said panel, said ignition switch being of the type including a lock barrel opening outwardly of said surface and oscillatable about a predetermined axis disposed generally normal to said surface, an elongated key including a blade end portion and an opposite end portion, said blade portion being removably insertable within said barrel to release the latter for oscillation between predetermined off and on positions thereof angularly displaced less than 180° relative to each other, an ignition switch cut-off safety device for angularly displacing the key and thus the barrel from its on position toward its off position, said safety device including an elongated body secured at one end to said opposite end portion of said key with said body extending transversely of the longitudinal extent of said key, a guide eye mounted on said panel in spaced relation relative to said switch, outwardly from said surface and on a path extending across said panel away from said switch in the direction in which the other end of said body extends when said lock barrel is in said off position, an elongated flexible tether member, first anchor means anchoring one end of said tether member to said other end of said body, second anchor means on the other end of said tether member for attachment to the operator of an associated vehicle, the midportion of said tether member being guidingly engaged through said guide eye for lengthwise shifting of said tether member relative to said guide eye, said first anchor means comprising an anchor member mounted on said one end of said tether member, said anchor member and said other end of said body including coacting means supporting said anchor means from said body for separation therefrom in response to a thrust in excess of a predetermined value being applied to said anchor member in a direction extending endwise outwardly of said other end of said body, said anchor member being of a size to pass freely through said guide eye.

2. The combination of claim 1 wherein said other end of said body defines an endwise outwardly opening recess, said second anchor means including an anchor element carried by said one end of said tether member releasably frictionally received in said recess.

3. In combination with a panel having an ignition switch mounted therefrom with said ignition switch being of the type including a lock barrel oscillatable about a predetermined axis and an elongated key including a blade end portion and an opposite end portion, said blade portion being removably insertable within said barrel to release the latter for oscillation between predetermined off and on positions thereof angularly displaced less than 180° relative to each other, an ignition switch cut-off safety device for angularly displacing the key and thus the barrel from its on position toward its off position, said safety device including an elongated body secured at one end to said opposite end portion of said key with said body extending transversely of the longitudinal extent of said key, guide structure mounted on said panel in spaced relation relative to said switch and on a path extending across said panel away from said switch in the direction in which the other end of said body extends when said lock barrel is in said off position, an elongated flexible tether member, first anchor means anchoring one end of said tether member to said other end of said body, second anchor means on the other end of said tether member for attachment to the operator of an associated vehicle, the mid portion of said tether member being guidingly engaged with said guide structure for lengthwise shifting of said tether member relative to said guide, said other end of said body defining an endwise outwardly opening recess, said second anchor means including an anchor element carried by said one end of said tether member releasably frictionally received in said recess, said recess being elongated, extending longitudinally of said body and generally cylindrical in configuration, said anchor element comprising a cylindrical member having a longitudinal bore formed therethrough, the end of said bore opening into said recess including an enlarged counterbore, said one end of said tether member being snugly received through said bore and including an enlargement thereon seated in said counterbore.

4. The combination of claim 3 wherein said body includes a longitudinal slot opening outwardly therefrom and including one end portion defined by said one end of said body, means pivotally anchoring the opposite end portion of said key in said slot for swinging of said key from an extended position with said lock barrel insertable end portion extending transversely of said body outwardly of said slot to a folded retracted position with said lock barrel end portion recessed within and extending along said slot toward the other end of said slot.

5. The combination of claim 3 wherein said guide structure comprises an eye member including a mounting shank portion supported from said panel.

6. The combination of claim 3 wherein said second anchor means comprises a flattened sleeve member adapted to slidingly receive one end portion of the belt of the operator of said vehicle therethrough.

* * * * *